United States Patent
Chuppala et al.

(10) Patent No.: US 10,652,713 B2
(45) Date of Patent: May 12, 2020

(54) METHOD OF APPLICATION DATA SWITCHING BETWEEN A DEVICE IN A WIRELESS PAN MESH NETWORK AND A VIRTUAL ETHERNET INTERFACE

(71) Applicant: Futurewei Technologies, Inc., Plano, TX (US)

(72) Inventors: Ravi Chuppala, Cupertino, CA (US); Jun Xu, Cupertino, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/439,642

(22) Filed: Feb. 22, 2017

(65) Prior Publication Data

US 2018/0242099 A1  Aug. 23, 2018

(51) Int. Cl.
  *H04W 4/50* (2018.01)
  *H04W 8/26* (2009.01)
  (Continued)

(52) U.S. Cl.
  CPC ............... *H04W 4/50* (2018.02); *H04W 4/80* (2018.02); *H04W 8/26* (2013.01); *H04L 45/66* (2013.01);
  (Continued)

(58) Field of Classification Search
  CPC ............. H04L 12/2834; H04L 12/4625; H04L 29/1283; H04L 12/2836; H04L 45/66;
  (Continued)

(56) References Cited

U.S. PATENT DOCUMENTS

| 7,826,364 B1 | 11/2010 | Krzanowski et al. |
| 2005/0160180 A1 | 7/2005 | Rabje et al. |

(Continued)

FOREIGN PATENT DOCUMENTS

| CN | 101005418 A | 7/2007 |
| CN | 101242370 A | 8/2008 |

(Continued)

OTHER PUBLICATIONS

Reen-Cheng Wang, Internetworking Between ZigBee/802.15.4 and IPv6/802.3 Network, Aug. 2007, ACM.*

(Continued)

*Primary Examiner* — Harun Chowdhury
(74) *Attorney, Agent, or Firm* — Schwegman Lundberg & Woessner, P.A.

(57) ABSTRACT

A computer-implemented method for application data switching comprises receiving, by one or more processors of a computer, an application data packet received from an application running on the computer; determining, by the one or more processors and from the application data packet, an Ethernet destination of the application data packet; based on the determined Ethernet destination, identifying, by the one or more processors, a destination on a wireless personal area network (WPAN); accessing, by the one or more processors, a payload of the application data packet; creating, by the one or more processors, a WPAN data packet that includes the identified destination on the WPAN and at least a portion of the payload from the application data packet; and transmitting, by the one or more processors, the WPAN data packet to the identified destination on the WPAN via a WPAN interface.

20 Claims, 8 Drawing Sheets (51) Int. Cl.
| | |
|---|---|
| *H04W 4/80* | (2018.01) |
| *H04W 84/12* | (2009.01) |
| *H04L 12/721* | (2013.01) |
| *H04L 29/06* | (2006.01) |
| *H04W 80/02* | (2009.01) |
| *H04W 84/18* | (2009.01) |

(52) U.S. Cl.
CPC ............ *H04L 69/08* (2013.01); *H04W 80/02* (2013.01); *H04W 84/12* (2013.01); *H04W 84/18* (2013.01)

(58) Field of Classification Search
CPC ........ H04L 69/08; H04W 4/80; H04W 74/04; H04W 76/02; H04W 76/10; H04W 4/50; H04W 8/26; H04W 76/11; H04W 84/18
USPC ........ 370/329, 338, 392, 401, 351, 389, 397
See application file for complete search history.

(56) References Cited

U.S. PATENT DOCUMENTS

| | | | |
|---|---|---|---|
| 2007/0076648 | A1 | 4/2007 | Yong |
| 2008/0056261 | A1* | 3/2008 | Osborn ............... H04L 12/2834 370/392 |
| 2009/0245278 | A1 | 10/2009 | Kee |
| 2010/0214949 | A1 | 8/2010 | Smith et al. |
| 2012/0099579 | A1 | 4/2012 | Kim et al. |
| 2012/0214949 | A1 | 8/2012 | Aoki et al. |
| 2013/0003530 | A1 | 1/2013 | Davari |
| 2014/0226659 | A1 | 8/2014 | Tsirkin |
| 2014/0269263 | A1 | 9/2014 | Zeng et al. |
| 2015/0010003 | A1 | 1/2015 | Song et al. |
| 2015/0381531 | A1 | 12/2015 | Huang |
| 2016/0021684 | A1* | 1/2016 | Lewis ................... H04W 76/02 370/329 |
| 2016/0119251 | A1 | 4/2016 | Solis et al. |
| 2016/0315687 | A1 | 10/2016 | Jeanne et al. |
| 2017/0237626 | A1 | 8/2017 | Nair et al. |
| 2018/0262393 | A1 | 9/2018 | Xu et al. |
| 2018/0324280 | A1 | 11/2018 | Solis et al. |

FOREIGN PATENT DOCUMENTS

| | | |
|---|---|---|
| CN | 102611634 A | 7/2012 |
| CN | 103152190 A | 6/2013 |
| CN | 103490961 A | 1/2014 |
| CN | 104821925 A | 8/2015 |
| CN | 105553680 A | 5/2016 |
| CN | 106068039 A | 11/2016 |
| CN | 106209932 A | 12/2016 |
| WO | WO-2013138977 A1 | 9/2013 |

OTHER PUBLICATIONS

"Bluetooth", [online]. [archived on Dec. 27, 2016]. Retrieved from the Internet: <URL: https://wiki.archlinux.org/index.php/bluetooth>, (Dec. 15, 2016), 8 pgs.
"Introducing the Official XBee Java Library", [online]. © 1996-2017 Digi International Inc. [retrieved on Jun. 9, 2017]. [Retrieved from the Internet: <URL: https://www.digi.com/blog/community/official-xbee-Java-library/>, (2017), 3 pgs.
"Zigbee Wireless Networking Systems", {online], © 2017 Silicon Laboratories. [retrieved on Jun. 9, 2017]. Retrieved from the Internet: <URL: http://www.silabs.com/products/wireless/mesh-networking/zigbee>, 8 pgs.
Janc, Szymon, "Bluetooth on modern Linux", Embedded Linux Conference, San Diego, 2016, [online]. Retrieved from the Internet: <URL: http://events.linuxfoundation.org/sites/events/files/slides/Bluetooth%20on%20Modern%20Linux_0.pdf>, (2016), 28 pgs.
"Cel MeshConnect™ User Guide", 0018-08-08-00-000 HA1.2.1 ZigBee-to-Ethernet Gateway Demo User Guide, (Jul. 15, 2015), 1-10.
"Getting Started with ZigBee® Reference Designs", [online]. [retrieved on Jan. 4, 2017]. Retrieved from the Internet: <URL: http://www.silabs.com/products/wireless/Pages/zigbee-reference-design-getting-started.aspx>, (2017), 5 pgs.
"IEEE Standard for Local and metropolitan area networks—Part 15.4: Low-Rate Wireless Personal Area Networks (LR-WPANs)", IEEE Std 802.15.4™-2011 (Revision of IEEE Std 802.15.4-2006, (Sep. 5, 2011), 314 pgs.
"Introducing the Official XBee Java Library—Machine Talk Blog", [online]. © Copyright 1996-2017 Digi International Inc. [retrieved on Jan. 4, 2017]. Retrieved from the Internet: <URL: http://www.digi.com/blog/community/official-xbee-java-library/>, (2017), 2 pgs.
"ZigBee Specification", Copyright @ 2007 ZigBee Standards Organization. Document 053474r17, (2007), 604 pgs.
"Internatonal Application Serial No. PCT/CN2018/076789, International Search Report dated May 18, 2018", 4 pgs.
"Internatonal Application Serial No. PCT/CN2018/076789, Written Opinion dated May 18, 2018", 4 pgs.
"Internatonal Application Serial No. PCT/CN2018/078361, International Search Report dated May 16, 2018", 4 pgs.
"Internatonal Application Serial No. PCT/CN2018/078361, Written Opinion dated May 16, 2018", 4 pgs.
Kim, K., et al., "Interoperability of 6LoWPAN draft-daniel-6lowpan-interoperability-01.txt", Network Working Group, Internet-Draft, (Jul. 9, 2005), 10 pgs.
"U.S. Appl. No. 15/453,816, Non Final Office Action dated Aug. 10, 2018", 16 pgs.
U.S. Appl. No. 15/453,816, Response filed Nov. 7, 2018 to Non Final Office Action dated Aug. 10, 2018, 13 pgs.
"U.S. Appl. No. 15/453,816, Final Office Action dated Feb. 21, 2019", 17 pgs.
"U.S. Appl. No. 15/453,816, Response filed Apr. 9, 2019 to Final Office Action dated Feb. 21, 2019", 11 pgs.
U.S. Appl. No. 15/453,816, Notice of Allowance dated Jul. 22, 2019, 8 pgs.
European Application No. 18758076.6, Extended European Search Report dated Oct. 9, 2019, (dated Oct. 9, 2019), 9 pgs.
"European Application No. 18763850.7, Extended European Search Report dated Dec. 11, 2019", (dated Dec. 11, 2019), 9 pgs.
Aljabari, Ghannam, et al., "Virtualization of Wireless LAN Infrastructures", The 6th IEEE International Conference on Intelligent Data Acquisition and Advanced Computing Systems: Technology and Applications, Sep. 15-17, 2011, Prague, Czech Republic; XP031990339, (Sep. 15, 2011), 5 pgs.
Templin, F., "MANET Autoconfiguration over Virtual Ethernets; draft-templin-autoconf-virtual-00.txt", Internet Engineering Task Force, IETF; Standard Working Draft, Internet Society (ISOC), Geneva, Switzerland; XP015050471, (Feb. 20, 2007), 15 pgs.
"Chinese Application No. 201880008865.9, First Office Action dated Jan. 20, 2020", (dated Jan. 20, 2020), 13 pgs.
"Chinese Application No. 201880013246.9, Office Action dated Feb. 3, 2020", (dated Feb. 3, 2020), 6 pgs.

* cited by examiner

| WPAN DATA SWITCHING TABLE | | |
|---|---|---|
| SLOT | EUID/NETID | MAC ADDRESS |
| 1 | 0508307F91130024/0XE833 | /DEV/E01/(MAC-ADDR 1) |
| 2 | 0508307F91130024/0XE834 | /DEV/E02/(MAC-ADDR 2) |
| 3 | 0508307F91130024/0XE835 | /DEV/E03/(MAC-ADDR 3) |
| 4 | 0508307F91130024/0XE836 | /DEV/E04/(MAC-ADDR 4) |
| 5 | 0508307F91130024/0XE837 | /DEV/E05/(MAC-ADDR 5) |
| 6 | 0508307F91130024/0XE838 | /DEV/E06/(MAC-ADDR 6) |
| 7 | 0508307F91130024/0XE839 | /DEV/E07/(MAC-ADDR 7) |

| APPLICATION SUPPORT DATA FRAME | |
|---|---|
| SIZE | LABEL |
| 1 | FRAME CONTROL |
| 0/1 | DESTINATION ENDPOINT |
| 0/2 | GROUP ADDRESS |
| 2 | CLUSTER IDENTIFIER |
| 2 | PROFILE IDENTIFIER |
| 1 | SOURCE ENDPOINT |
| 1 | APPLICATION SUPPORT COUNTER |
| 0/1/2 | EXTENDED HEADER |
| 0-100 | DATA PAYLOAD |

| ETHERNET FRAME ||  |
|---|---|---|
| SIZE | LABEL | 810 |
| 7 | PREAMBLE | 820 |
| 1 | START FRAME DELIMITER | 830 |
| 6 | DESTINATION MAC ADDRESS | 840 |
| 6 | SOURCE MAC ADDRESS | 850 |
| 2 | ETHER TYPE | 860 |
| 42-1500 | DATA PAYLOAD | 870 |
| 4 | FRAME CHECK SEQUENCE | |

FIG. 8

METHOD OF APPLICATION DATA SWITCHING BETWEEN A DEVICE IN A WIRELESS PAN MESH NETWORK AND A VIRTUAL ETHERNET INTERFACE

CROSS-REFERENCE TO RELATED APPLICATIONS

This application is related to co-pending, commonly assigned, U.S. patent application Ser. No. 15/453,816, entitled "ABSTRACTING WIRELESS DEVICE TO VIRTUAL ETHERNET INTERFACE," filed on Mar. 8, 2017, which is hereby incorporated by reference in its entirety.

TECHNICAL FIELD

The present disclosure is related to application data switching, and in particular to application data switching between wireless personal area network (WPAN) mesh network devices using a virtual Ethernet interface.

BACKGROUND

A low-bandwidth WPAN has a particular protocol network stack. In order to support devices on a low-bandwidth WPAN, application code running on a device is typically tightly integrated with the protocol network stack of the low-bandwidth mesh network. Low-bandwidth WPAN protocol stacks are vendor specific.

SUMMARY

A computer-implemented method for application data switching comprises receiving, by one or more processors, an application data packet received from an application via a virtual Ethernet interface; determining, by the one or more processors and from the application data packet, an Ethernet destination of the application data packet; based on the determined Ethernet destination, identifying, by the one or more processors, a destination on a WPAN; accessing, by the one or more processors, a payload of the application data packet; creating, by the one or more processors, a WPAN data packet that includes the identified destination on the WPAN and at least a portion of the payload from the application data packet; and transmitting, by the one or more processors, the WPAN data packet to the identified destination on the WPAN via a WPAN interface.

A device comprises a memory storage comprising instructions, a WPAN interface coupled to a WPAN, and one or more processors in communication with the memory. The one or more processors execute the instructions to perform receiving an application data packet from an application via a virtual Ethernet interface; determining, from the application data packet, an Ethernet destination of the application data packet; based on the Ethernet destination of the application data packet, identifying a destination on the WPAN; accessing a payload of the application data packet; creating a WPAN data packet that includes the identified destination on the WPAN and at least a portion of the payload from the application data packet; and transmitting the WPAN data packet to the identified destination on the WPAN via the WPAN interface.

A non-transitory computer-readable medium stores computer instructions for application data switching, that when executed by one or more processors, cause the one or more processors to perform steps of receiving an application data packet from an application via a virtual Ethernet interface; determining, from the application data packet, an Ethernet destination of the application data packet; based on the determined Ethernet destination, identifying a destination on a WPAN; accessing a payload of the application data packet; creating a WPAN data packet that includes the identified destination on the WPAN and at least a portion of the payload from the application data packet; and transmitting the WPAN data packet to the identified destination on the WPAN via a WPAN interface.

DETAILED DESCRIPTION

In the following description, reference is made to the accompanying drawings that form a part hereof, and in which are shown by way of illustration specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

A WPAN is a network topology in which each device on the network relays data for the network. A WPAN includes end devices, routers, and coordinators. WPANs may provide redundancy by providing alternate network paths for the transmission of data when one node fails. A low-bandwidth WPAN has a protocol network stack that is distinct from the protocol network stack of a high-bandwidth Ethernet network. Example low-bandwidth WPAN protocols include ZigBee, Zwave, and other protocols based on the IEEE 802.15.4 technical standard. The ZigBee Specification (ZigBee Document 053474r17 Jan. 17, 2008, ZigBee Standards Organization) is incorporated herein by reference in its entirety. The IEEE Standard for Local and metropolitan area networks—Part 15.4: Low-Rate Wireless Personal Area Networks (LR-WPANs) (IEEE Std. 802.15.4-2011 Sep. 5, 2011, IEEE) is incorporated herein by reference in its entirety.

Ethernet is an example high-bandwidth broadcast network. Within a virtual Ethernet network, packets can be addressed to a broadcast address, causing the packets to be routed to all destinations on the network (or a broadcast domain of the network). Alternatively, packets may be addressed to a single destination or a multi-cast address that identifies more than one destination but less than the entire network (or broadcast domain).

Data for an application running on a machine coupled to the virtual Ethernet network is decoupled from the protocol network stack of the WPAN using data switching. The machine is coupled to the WPAN and accesses data that maps an identifier on the WPAN to an alias on the virtual Ethernet network (e.g., a virtual Ethernet address). The machine extracts data from packets addressed to the virtual Ethernet address and generates packets on the WPAN that contain the data and are addressed to the device corresponding to the identifier on the WPAN.

Figure 1:
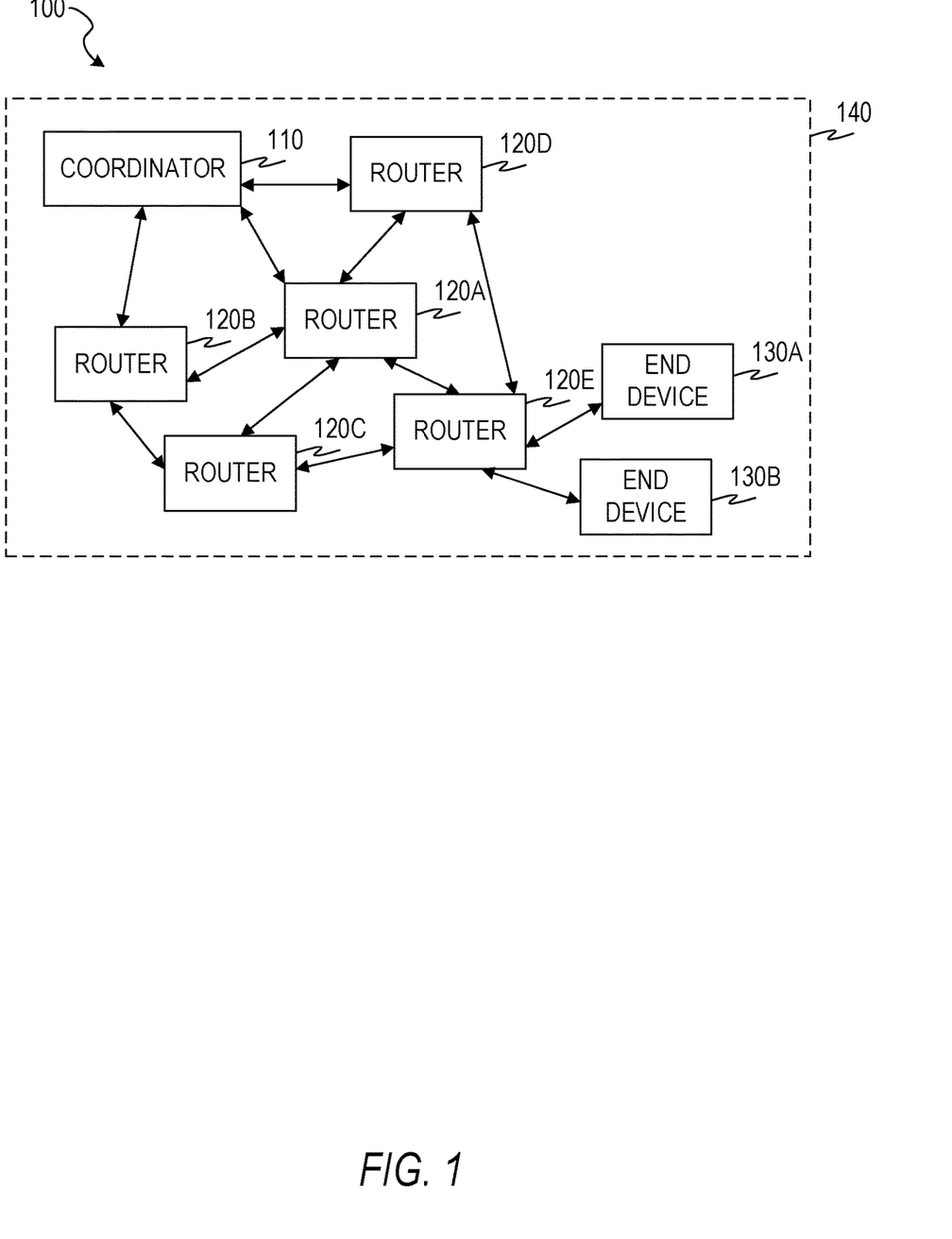
FIG. 1 is a block diagram illustration of a coordinator of a WPAN in communication with servers on a virtual Ethernet network, according to some example embodiments.

FIG. 1 is a block diagram illustration 100 of a network environment that includes a wireless personal area network (WPAN) 140, according to some example embodiments. The WPAN 140 includes a coordinator 110, routers 120A, 120B, 120C, 120D, and 120E, and end devices 130A and 130B. The coordinator 110, the routers 120A-120E, and the end devices 130A-130B communicate using a network protocol stack of the WPAN 140 (e.g., the ZigBee network protocol stack or the Zwave protocol stack). In the WPAN 140, the coordinator 110 creates the network, controls its parameters, and performs basic maintenance, such as adding and dropping routers and end devices. Each router node in the WPAN 140 receives traffic from other nodes (e.g., the coordinator 110, other routers 120A-120E, or the end devices 130A-130B) and forwards that traffic on a path to its destination. In some example embodiments, the routers 120A-120E are also end devices. For example, the coordinator 110 may be the central hub of a home automation system and each of the routers 120A-120E and end devices 130A-130B may be parts of that home automation system (e.g., temperature sensors, light detectors, motion detectors, light controllers, thermostats, or any suitable combination thereof). Thus, the routers 120A-120E and end devices 130A-130B report data to the coordinator 110 via the WPAN 140 and receive commands from the coordinator 110 via the WPAN 140.

An application running on the coordinator 110 may use a virtual Ethernet interface to communicate with the end devices 130A-130B using the Ethernet network protocol instead of the network protocol stack of the WPAN 140. The virtual Ethernet interface provides conversion functions to render the different network protocol stack of the WPAN 140 transparent to the application. For example, if the application sends an Ethernet packet that uses a destination address that corresponds to a device on the WPAN 140, the coordinator 110 generates a WPAN packet containing the same data payload as the received Ethernet packet. The coordinator 110 sends the generated packet to the destination device via the WPAN 140. If the Ethernet packet uses a destination address that does not correspond to a device on the WPAN 140, the Ethernet packet may be dropped.

Any of the machines or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

Figure 2:
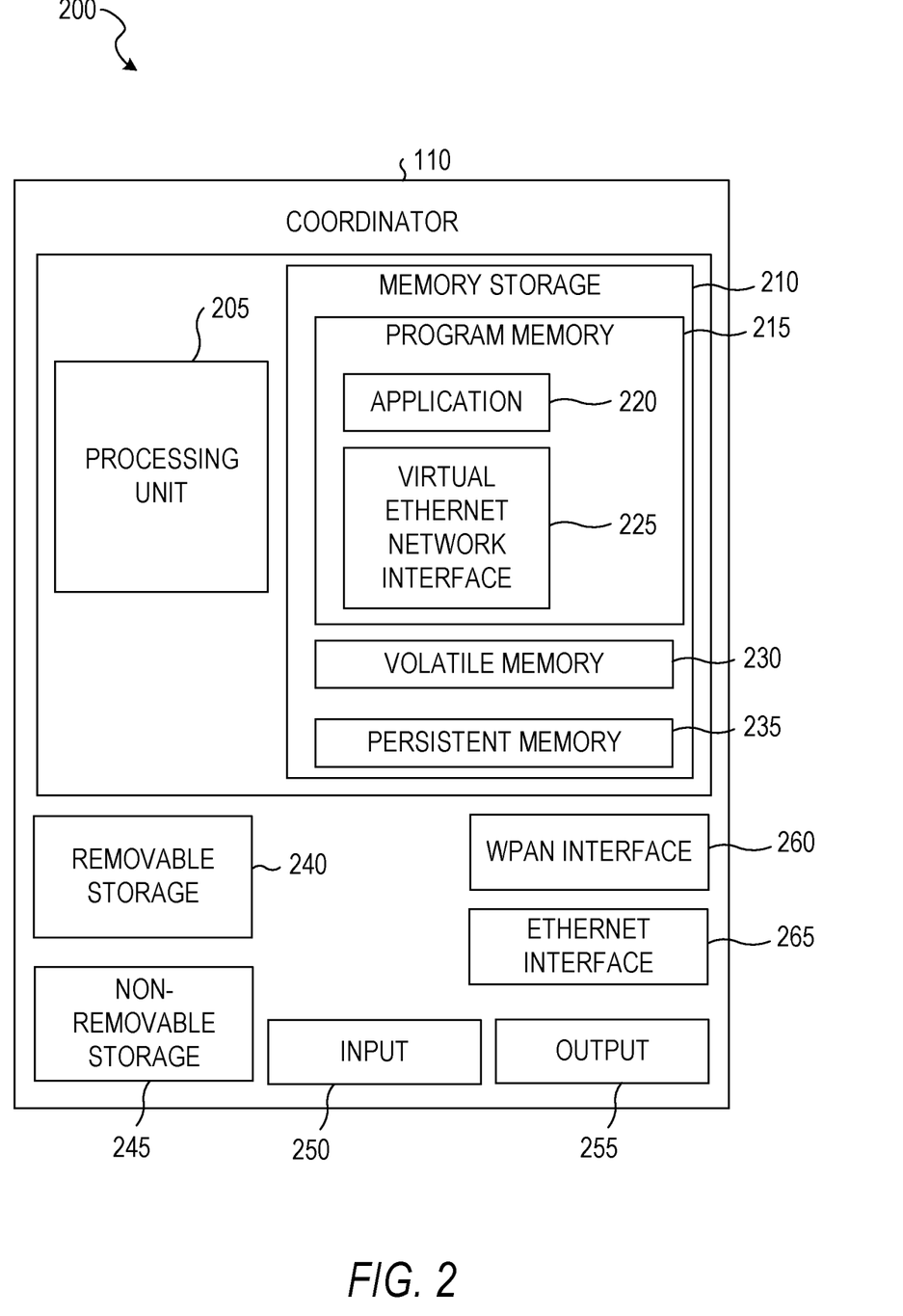
FIG. 2 is a block diagram illustration of a coordinator of a WPAN, according to some example embodiments.

FIG. 2 is a block diagram illustrating components of the coordinator 110, according to some example embodiments. All components need not be used in various embodiments. One example coordinator 110 in the form of a computer 200 (also referred to as computing device 200 and computer system 200) includes a processing unit 205, memory storage 210, removable storage 240, non-removable storage 245, input 250, output 255, and WPAN interface 260. The processing unit 205 may be comprised of one or more processors. Each of the processing unit 205, memory storage 210, removable storage 240, non-removable storage 245, input 250, output 255, and WPAN interface 260 is a hardware component. The memory storage 210 includes program memory 215, volatile memory 230, and persistent memory 235. The program memory 215 stores an application 220 and a virtual Ethernet interface 225.

Although the example computing device is illustrated and described as the computer 200, the computing device may be in different forms in different embodiments. For example, the computing device may instead be a smartphone, a tablet, a smart watch, or another computing device including elements the same as or similar to those illustrated and described with regard to FIG. 2. Devices, such as smartphones, tablets, and smart watches, are generally collectively referred to as "mobile devices" or "user equipment". Further, although the various data storage elements are illustrated as part of the computer 200, the storage may also or alternatively include cloud-based storage accessible via a network, such as the Internet, or server-based storage.

The program memory 215 may store programs and applications, and may form part of either the volatile memory 230 or the persistent memory 235. The computer 200 may include—or have access to a computing environment that includes—a variety of computer-readable media, such as the volatile memory 230, the persistent memory 235, the removable storage 240, and the non-removable storage 245. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes input 250, output 255, and a WPAN interface 260. The input 250 may include one or more of a touchscreen, a touchpad, a mouse, a keyboard, a camera, one or more device-specific buttons, one or more sensors integrated within or coupled via wired or wireless data connections to the computer 200, and other input devices. The output 255 may include a display device, such as a touchscreen, that also may serve as an input device. The computer 200 may operate in a networked environment using the Ethernet interface 265 to connect to one or more remote computers, such as database servers. The remote computer may include a personal computer (PC), server, router, network PC, peer device or other common network node, or the like. The Ethernet interface 265 may connect to a Local Area Network (LAN), a Wide Area Network (WAN), a cellular network, a WiFi network, a Bluetooth network, or other networks.

Computer-readable instructions stored on a computer-readable medium (e.g., the application 220 and the virtual Ethernet interface 225 stored in the memory storage 210) are executable by the processing unit 205 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

In some example embodiments, alternatives to the processor 205 are used, such as an ASIC, an FPGA, or any suitable combination of processors, ASICs, and FPGAs. Moreover, the application 220 and the virtual Ethernet interface 225 may be combined into a single application or the functions described herein for a single application may be subdivided among multiple applications. Furthermore, according to various example embodiments, elements described herein as being implemented within a single machine, database, or device may be distributed across multiple machines, databases, or devices.

The WPAN interface 260 is configured to send and receive data on the WPAN 140. The virtual Ethernet network interface 225 is configured to receive Ethernet data packets generated by the application 220 for sending on the WPAN 140. For example, the application 220 may open a socket and bind it to an IP address. The virtual Ethernet network interface 225 receives data sent on the socket to the IP address. A socket is a connection between software applications running on the same or different computers that allows for data transmission between the applications. The socket may be a raw socket, in which data to be transmitted between the applications includes both the data payload and a header. For example, the Ethernet frame 800 of FIG. 8, including a number of fields in addition to the data payload 860, may be transmitted via a raw socket.

The virtual Ethernet network interface 225 is also configured to generate data packets that conform to the Ethernet format. For example, the WPAN interface 260 may receive data over the WPAN 140 destined for the application 220 and forward the received data to the virtual Ethernet network interface 225. The virtual Ethernet network interface 225 may send the received data to the application 220 using the socket created by the application 220. As another example, the virtual Ethernet network interface 225 may receive one or more application data packets from the application 220 that are destined for the end device 130A and request the WPAN interface 260 to send the received data to the end device 130A via the WPAN 140.

Figure 6:
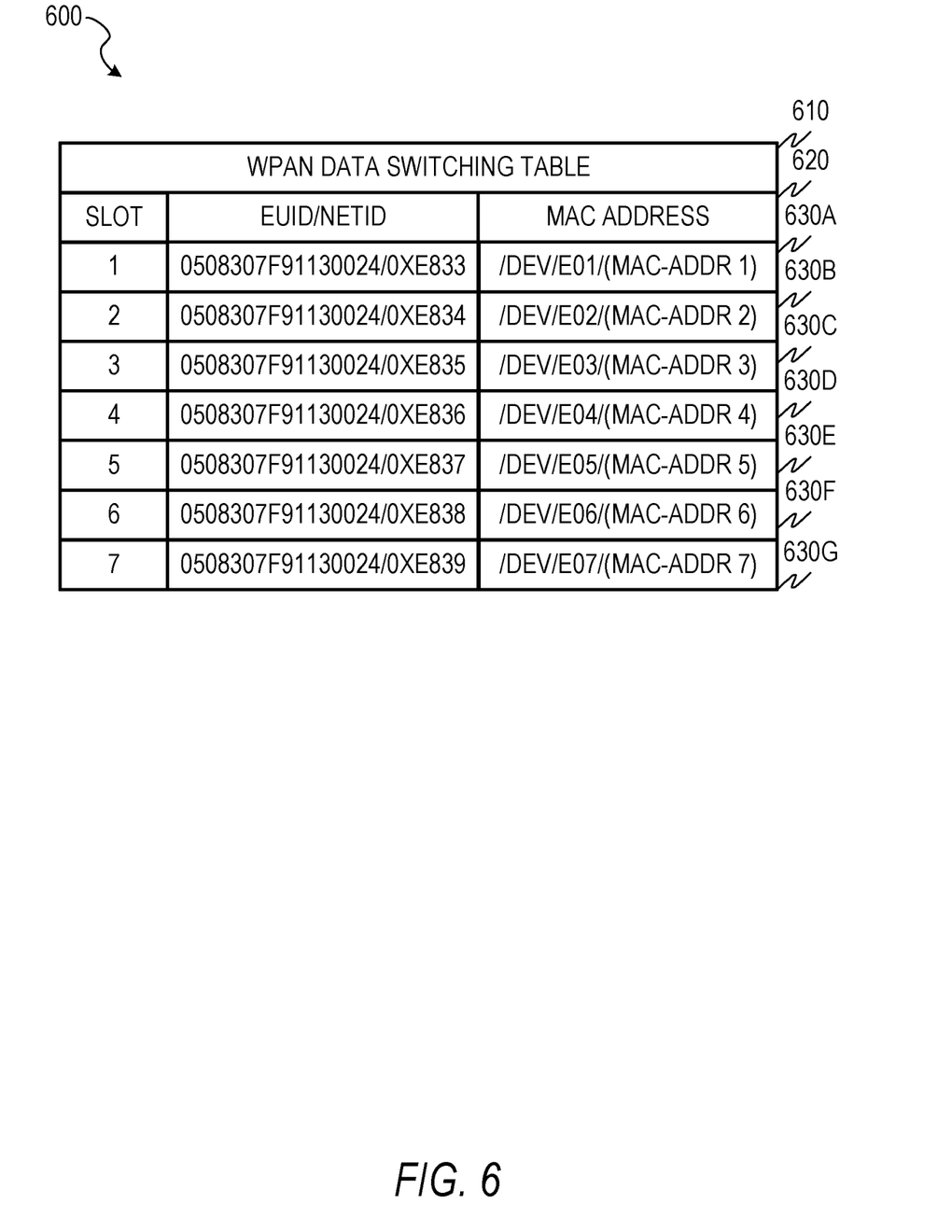
FIG. 6 is a block diagram illustration of a database schema for use in a method of application data switching between a WPAN and a virtual Ethernet network, according to some example embodiments.

The WPAN data switching table 610 of FIG. 6 may be stored in the volatile memory 230, the persistent memory 235, the removable storage 240, the non-removable storage 245, or any suitable combination thereof. The WPAN data switching table 610 may be accessed by the virtual Ethernet interface 225.

Figure 3:
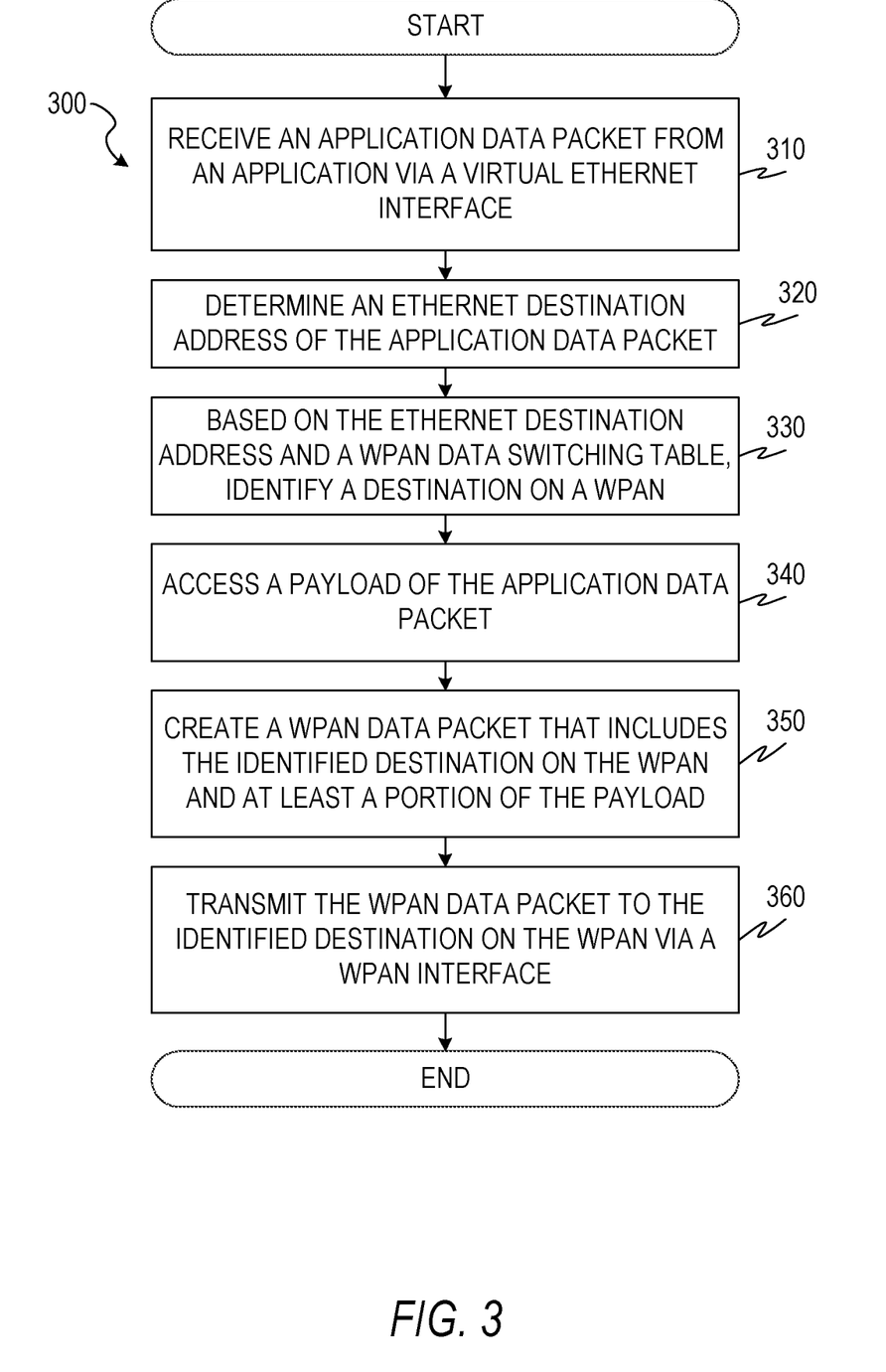
FIG. 3 is a flowchart illustration of a method of application data switching between a WPAN and a virtual Ethernet network, according to some example embodiments.

FIG. 3 is a flowchart illustration of a method 300 of application data switching between a WPAN network and a virtual Ethernet network, according to some example embodiments. The method 300 includes operations 310, 320, 330, 340, 350, and 360. By way of example and not limitation, the method 300 is described as being performed by the components and applications of the coordinator 110 shown in FIG. 2. In other example embodiments, the method 300 is performed by a computer other than the coordinator 110.

In operation 310, the virtual Ethernet network interface 225 receives an application data packet from an application running on the coordinator 110 via the virtual Ethernet network interface 225. For example, the application 220 may open a socket connection to the virtual Ethernet network interface 225 and send an application data packet through the socket.

In operation 320, the virtual Ethernet network interface 225 determines an Ethernet destination address for the application data packet. For example, the destination MAC address 830 of the Ethernet frame 800 of FIG. 8 may be read as the Ethernet destination address.

Based on the Ethernet destination address and a WPAN data switching table, a destination on the WPAN 140 is identified (operation 330). For example, the virtual Ethernet network interface 225 may use the WPAN data switching table 610 of FIG. 6 to determine that the destination MAC address 830 corresponds to a device on the WPAN 140. Based on the address of the data packet, an address of a device on the WPAN 140 is identified. If the address of the data packet does not correspond to an entry in the WPAN data switching table 610, the application data packet may be ignored by the virtual Ethernet interface 225 and dropped.

Figure 8:
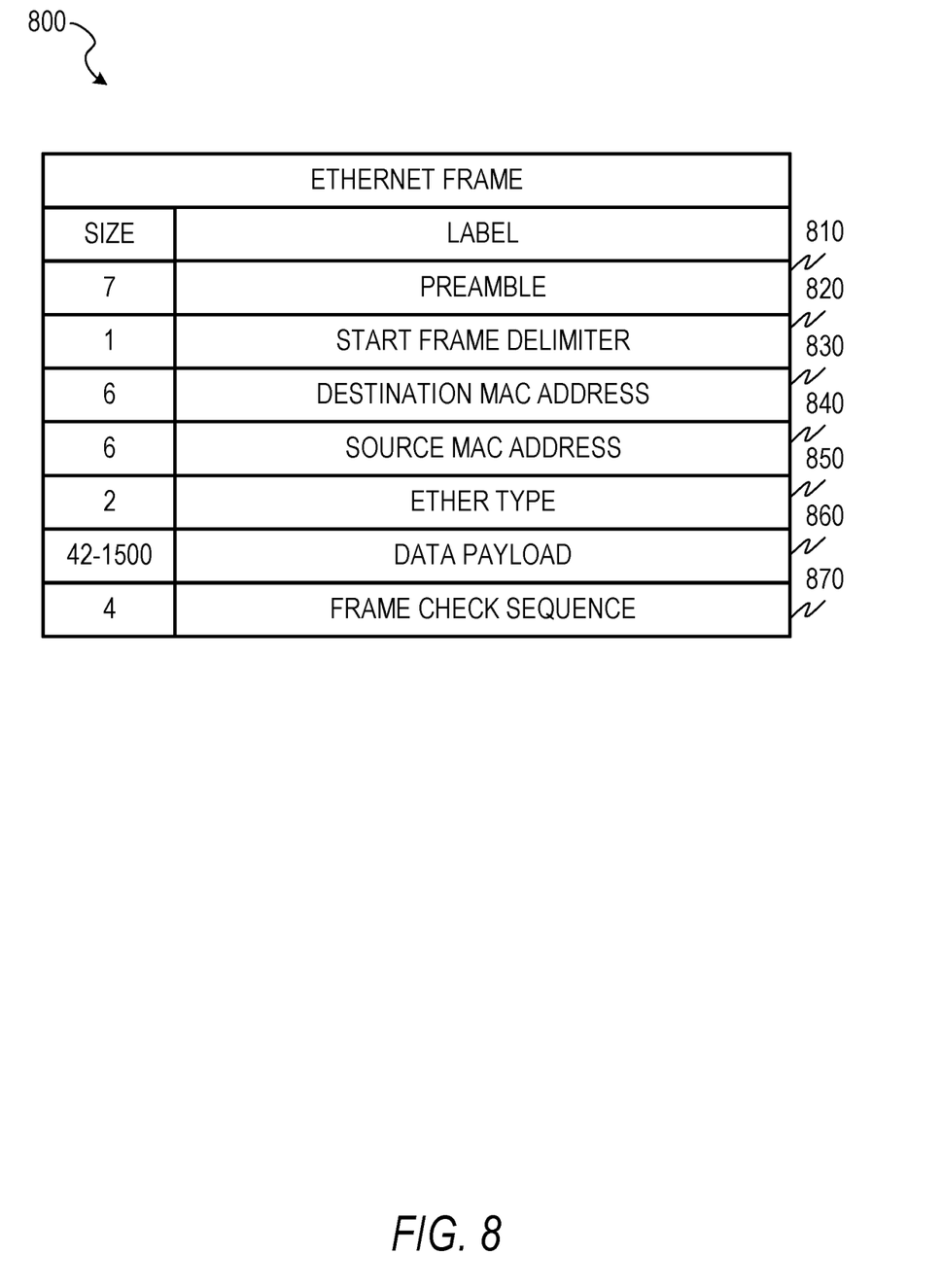
FIG. 8 is a block diagram illustration of an Ethernet frame, suitable for use in a virtual Ethernet network, according to some example embodiments.

In operation 340, the virtual Ethernet network interface 225 accesses a payload of the application data packet. For example, the data payload 860 of the Ethernet frame 800 may be accessed.

The virtual Ethernet network interface 225, in operation 350, creates a WPAN data packet that includes the identified destination on the WPAN and at least a portion of the payload. For example, a ZigBee or Zwave data packet may be created that is addressed to the device on the WPAN 140 identified in operation 330 and contains at least a portion of the data payload. In some example embodiments, the data packets of the Ethernet network are larger than the data packets of the WPAN 140. For example, the payload of an Ethernet frame 800 (shown in FIG. 8) has a maximum of 1500 bytes. By contrast, the payload of a ZigBee application support data frame 700 (shown in FIG. 7) cannot be larger than about 100 bytes.

In operation 360, the virtual Ethernet network interface 225 transmits the WPAN data packet to the destination via the WPAN 140. For example, the WPAN interface 260 may be used to transmit the data packet. In example embodiments in which the data packets of the WPAN 140 are smaller than the Ethernet data packets, operations 350 and 360 may be repeated until all of the data in the payload of the application data packet is sent, with each successive WPAN data packet including successive portions of the payload of the application data packet. Accordingly, the virtual Ethernet network interface 225 may divide the received application data into multiple packets to be transmitted on the WPAN interface 260. Each created WPAN data packet is addressed to the destination device on the WPAN and contains at least a portion of the data payload. In some example embodiments, the WPAN data packets are transmitted to one or more of the routers 120A-120E using a serial interface (e.g., a character interface).

Figure 4:
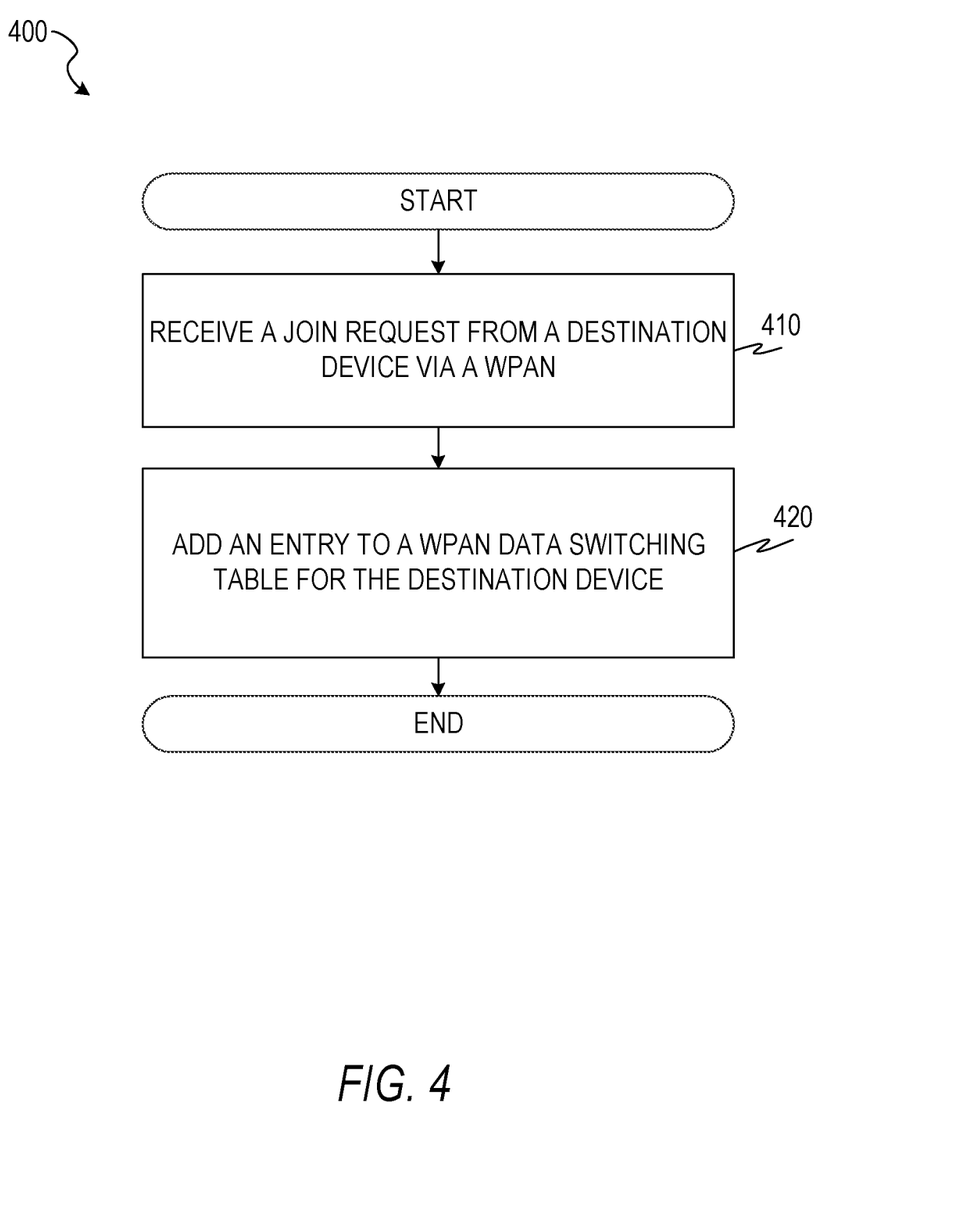
FIG. 4 is a flowchart illustration of a method of application data switching between a WPAN and a virtual Ethernet network, according to some example embodiments.

FIG. 4 is a flowchart illustration of a method 400 of application data switching between a WPAN and a virtual Ethernet network, according to some example embodiments. The method 400 includes operations 410 and 420. By way of example and not limitation, the method 400 is described as being performed by the components and applications of the coordinator 110 shown in FIG. 2.

In operation 410, the virtual Ethernet network interface 225 receives a join request from a destination device via a WPAN. For example, the virtual Ethernet network interface 225 may open a connection to the WPAN interface 260 so that when data is received via the WPAN interface 260, the data is forwarded to the virtual Ethernet network interface 225. After this connection is established, the WPAN interface 260 may receive a join request from the end device 130A and forward the received request to the virtual Ethernet network interface 225. In response to the join request, at operation 420, the virtual Ethernet network interface 225 creates adds an entry to a WPAN data switching table for the destination device, including a virtual Ethernet address for the destination device. For example, a row in the WPAN data switching table 610 may be created. The created row indicates the identifier of the destination device and the corresponding virtual Ethernet address.

Figure 5:
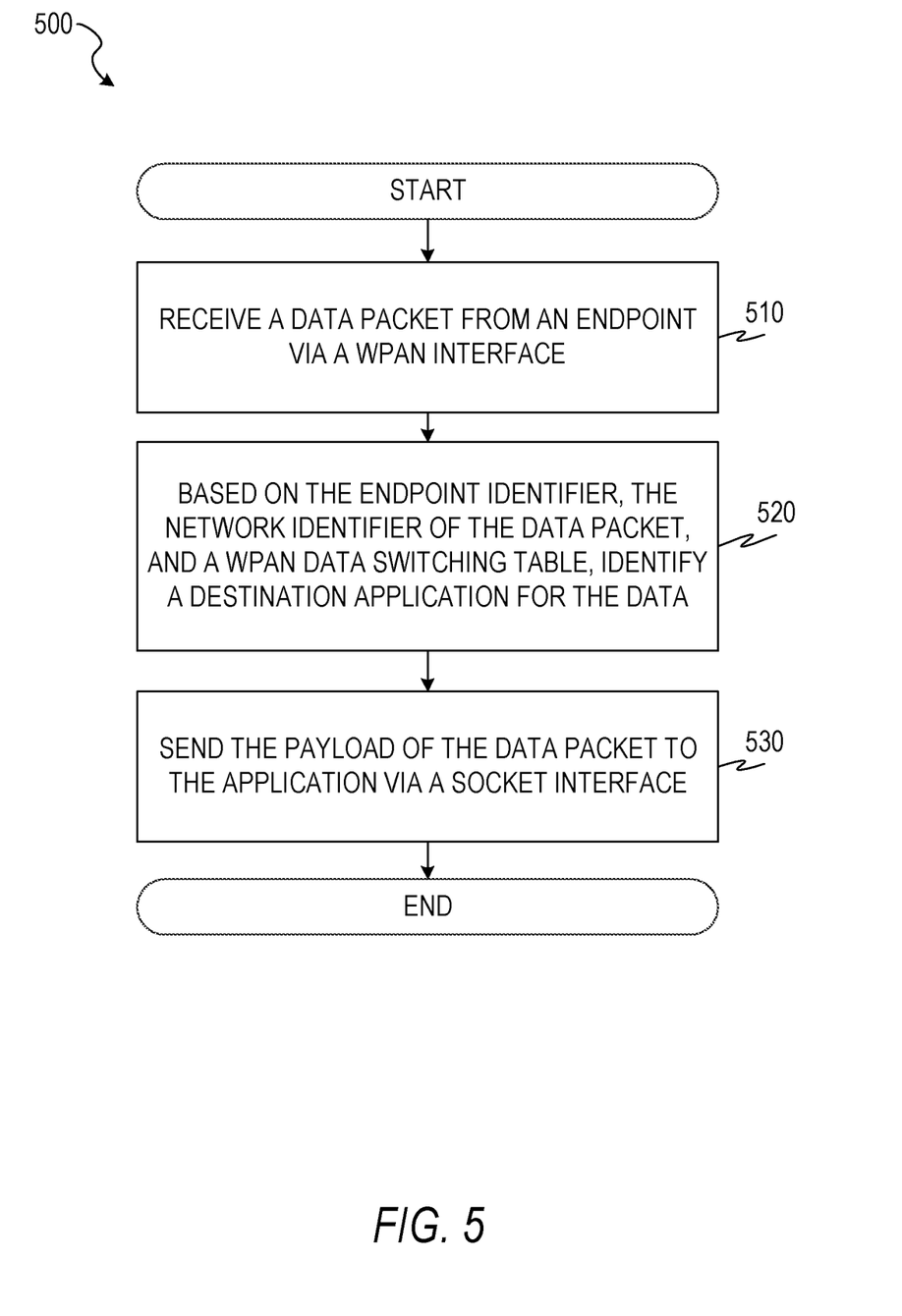
FIG. 5 is a flowchart illustration of a method of application data switching between a WPAN and a virtual Ethernet network, according to some example embodiments.

FIG. 5 is a flowchart illustration of a method 500 of application data switching between a WPAN network and a virtual Ethernet network, according to some example embodiments. The method 500 includes operations 510, 520, and 530. By way of example and not limitation, the method 500 is described as being performed by the components and applications of the coordinator 110 shown in FIG. 2.

In operation 510, the virtual Ethernet network interface 225 receives data from an application via a WPAN interface (e.g., the WPAN interface 260). For example, a ZigBee interface of the coordinator 110 may receive one or more application support data frames from an end device 130A via the WPAN 140, and forward the received application support data frames to the virtual Ethernet network interface 225.

In operation 520, the virtual Ethernet network interface 225 identifies a destination application for the data, based on the endpoint identifier, the network identifier of the data packet, and a WPAN data switching table. For example, the virtual Ethernet network interface 225 may determine the destination endpoint of the application support data frame by reading the header of the data packet. Then, the virtual Ethernet network interface 225 may use the WPAN data switching table 610 to identify a corresponding virtual Ethernet MAC address. If an application has opened a socket to the virtual Ethernet interface 225 using the identified MAC address, that application is identified as the destination application for the data.

The virtual Ethernet network interface 225, in operation 530, provides the data to the application through the open socket. For example, the data may be provided to the destination application in one or more Ethernet packets via a socket connection. In some example embodiments, the data packets of the virtual Ethernet network are smaller than the data packets of the WPAN 140. Accordingly, the virtual Ethernet network interface 225 may divide the data received using the WPAN interface 260 into multiple packets to be transmitted to the application. Each created Ethernet network data packet is addressed to the destination application and contains at least a portion of the data payload.

FIG. 6 is a block diagram illustration of a database schema 600 for use in a method of application data switching between a WPAN network and a virtual Ethernet network, according to some example embodiments. The database schema 600 includes a WPAN data switching table 610.

The WPAN data switching table 610 uses fields 620, such that each row in the WPAN data switching table 610 includes a slot identifier, an extended unique identifier/network identifier (EUID/NETID), and a media access control (MAC) address. The WPAN data switching table 610 includes one row 630A, 630B, 630C, 630D, 630E, 630F, and 630G for each end device on the WPAN (e.g., the end devices 130A-130B of the WPAN 140) for which virtual Ethernet network addresses have been created. The slot identifier provides a unique identifier within the WPAN data switching table 610 for each row. The EUID/NETID provides the unique identifier for the end device within the WPAN. The MAC address provides the virtual address for the end device on the virtual Ethernet network.

Figure 7:
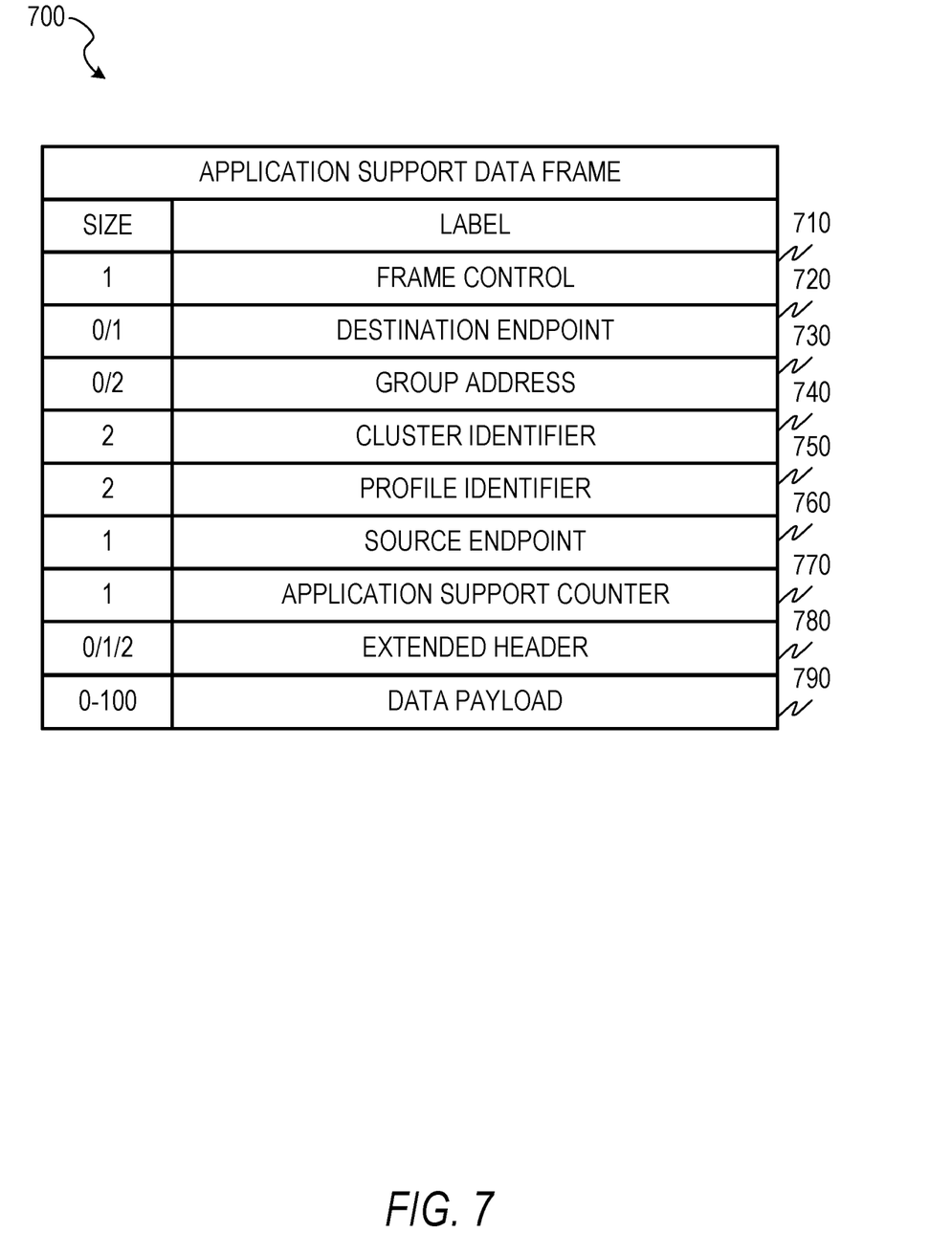
FIG. 7 is a block diagram illustration of an application support data frame format, suitable for use in a WPAN, according to some example embodiments.

FIG. 7 is a block diagram illustration of an application support data frame format 700, suitable for use in a WPAN, according to some example embodiments. The application support data frame format 700 includes a frame control 710, a destination endpoint 720, a group address 730, a cluster identifier 740, a profile identifier 750, a source endpoint 760, an application support counter 770, an extended header 780, and a data payload 790.

The frame control 710 is one byte long and indicates the frame type, delivery mode, indirect address mode, security, and acknowledgement request flag of the frame. The frame type indicates whether the frame is a data frame, a command frame, or an acknowledgement frame. The delivery mode indicates if the frame is for unicast or broadcast delivery.

The destination endpoint 720 is one byte long, if present, and identifies the address of an application within a node to receive the frame. The group address 730 identifies a collection of nodes within the network to receive the frame. The cluster identifier 740 is two bytes long and specifies the object within the application for which the frame is destined. The profile identifier 750 identifies a particular application domain, within which the destination endpoint 720, the group address 730, and the cluster identifier 740 are contained.

The source endpoint 760 is one byte long and identifies the address of an application within a node that sent the frame. The application support counter 770 is an 8-bit counter that is incremented with each frame sent. The extended header 780 is optional and, if present, is one or two bytes long. The data payload 790 contains the data destined for the identified application, node, cluster, and profile. The data payload 790 contains up to 100 bytes of data.

FIG. 8 is a block diagram illustration of an Ethernet frame 800, suitable for use in a virtual Ethernet network, according to some example embodiments. The Ethernet frame 800 includes a preamble 810, a start frame delimiter 820, a destination MAC address 830, a source MAC address 840, an Ether type 850, a data payload 860, and a frame check sequence 870.

The preamble 810 consists of 56 bits of alternating 1 and 0 bits. The start frame delimiter 820 is a single byte with the binary value of 10101011. The destination MAC address 830 is six bytes that indicate the MAC address of the device to receive the Ethernet frame 800. The source MAC address 840 is six bytes that indicate the MAC address of the device that sent the Ethernet frame 800. The Ether type 850 is a two-byte value that indicates the protocol used to encapsulate data in the payload portion of the Ethernet frame 800. The data payload 860 contains the data to be used at the application layer and contains between 42 and 1500 bytes. The frame check sequence 870 is a 32-bit checksum value that can be used to ensure that the Ethernet frame 800 was not corrupted during transmission.

Devices and methods disclosed herein may reduce time, processor cycles, and power consumed in allocating resources to clients. Devices and methods disclosed herein may also result in improved allocation of resources to clients, resulting in improved throughput and quality of service.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for application data switching comprising:
opening, by an application running on a processing unit of a computer, a raw socket;
binding, by the application, the raw socket to an Internet protocol (IP) address of a virtual Ethernet interface running on the processing unit;
generating an application data packet by the application;
sending, by the application, the application data packet to the virtual Ethernet interface via the raw socket;
receiving, by the virtual Ethernet interface, the application data packet, the application data packet being received via the raw socket;
determining, by the virtual Ethernet interface from the application data packet, an Ethernet destination address of the application data packet;
based on the determined Ethernet destination address, identifying, by the virtual Ethernet interface, a destination identifier of a device on a wireless personal area network (WPAN);
accessing, by virtual Ethernet interface, a payload of the application data packet;
creating, by the virtual Ethernet interface, a WPAN data packet that includes the destination identifier of the device on the WPAN and at least a portion of the payload from the application data packet; and
transmitting, by the virtual Ethernet interface using a WPAN interface, the WPAN data packet to the device on the WPAN using the destination identifier of the device on the WPAN.

2. The method of claim 1, further comprising:
prior to the accessing the payload of the application data packet:
receiving, by the virtual Ethernet interface, the destination identifier of the device on the WPAN from the device on the WPAN via the WPAN interface; and
adding, by the virtual Ethernet interface, the destination identifier of the device on the WPAN to a database that maps the destination identifier of the device on the WPAN to a virtual Ethernet address.

3. The method of claim 2, wherein the identifying of the destination identifier of the device on the WPAN comprises:
determining, by the virtual Ethernet interface, that the Ethernet destination address of the application data packet matches the virtual Ethernet address in the database; and
mapping, by the virtual Ethernet interface, the virtual Ethernet address in the database to the destination identifier of the device on the WPAN.

4. The method of claim 2, further comprising:
prior to the virtual Ethernet interface receiving the application data packet, sending, by the virtual Ethernet interface, the virtual Ethernet address to the application via the raw socket.

5. The method of claim 1, wherein the transmitting of the WPAN data packet to the device on the WPAN via the WPAN interface comprises transmitting the WPAN data packet via a serial interface.

6. The method of claim 1, further comprising:
receiving, by the virtual Ethernet interface, a second WPAN data packet that indicates a source address on the WPAN;
determining, by the virtual Ethernet interface, that the source address on the WPAN matches a WPAN address in a table in a database, the table in the database mapping WPAN addresses to virtual Ethernet network addresses;
based on the matching WPAN address, identifying, by the virtual Ethernet interface, a virtual Ethernet network address from the table;
identifying, by the virtual Ethernet interface, based on the second WPAN data packet, the application as a destination application for the WPAN data packet;
creating, by the virtual Ethernet interface, a virtual Ethernet packet that has a destination address of the identified virtual Ethernet network address; and
providing, by the virtual Ethernet interface, the created virtual Ethernet packet to the application via the raw socket.

7. The method of claim 1, wherein the WPAN is a ZigBee network.

8. The method of claim 1, wherein the WPAN is a Zwave network.

9. A device comprising:
a memory storage comprising instructions;
a wireless personal network (WPAN) interface coupled to a WPAN; and
a processing unit in communication with the memory, wherein the processing unit executes the instructions to perform:
opening, by an application running on the processing unit, a raw socket;

binding, by the application, the raw socket to an Internet protocol (IP) address of a virtual Ethernet interface running on the processing unit;

generating, by the application, an application data packet;

sending, by the application, the application data packet to the virtual Ethernet interface via the raw socket;

receiving, by the virtual Ethernet interface the application data packet from the application running on the processing unit, the application data packet being received via the raw socket;

determining, by the virtual Ethernet interface from the application data packet, an Ethernet destination address of the application data packet;

based on the Ethernet destination address of the application data packet, identifying, by the virtual Ethernet interface, a destination identifier of a WPAN device on the WPAN;

accessing, by the virtual Ethernet interface, a payload of the application data packet;

creating, by the virtual Ethernet interface, a WPAN data packet that includes the destination identifier of the WPAN device and at least a portion of the payload from the application data packet; and transmitting, by the virtual Ethernet interface, the WPAN data packet to the WPAN device using the destination identifier of the WPAN device via the WPAN interface.

10. The device of claim 9, wherein the virtual Ethernet interface running on the processing unit further performs:

prior to the receiving of the application data packet:

receiving the destination identifier of the WPAN device from the WPAN device via the WPAN interface; and adding the destination identifier of the WPAN device to a database that maps the destination identifier of the WPAN device to a virtual Ethernet address.

11. The device of claim 10, wherein the identifying of the destination identifier of the WPAN device comprises:

determining that the Ethernet destination address of the application data packet matches the virtual Ethernet address in the database; and mapping the virtual Ethernet address in the database to the destination identifier of the WPAN device.

12. The device of claim 10, wherein the virtual Ethernet interface running on the processing unit further performs:

prior to the receiving of the application data packet, sending the virtual Ethernet address to the application via the raw socket.

13. The device of claim 9, wherein the transmitting of the WPAN data packet to the WPAN device via the WPAN interface comprises transmitting the WPAN data packet via a serial interface.

14. The device of claim 9, wherein the virtual Ethernet interface running on the processing unit further performs:

receiving a second WPAN data packet that indicates a source address on the WPAN;

determining that the source address on the WPAN matches a WPAN address in a table in a database, the table in the database mapping WPAN addresses to virtual Ethernet network addresses;

based on the matching WPAN address, identifying a virtual Ethernet network address from the table;

identifying, based on the second WPAN data packet, the application as a destination application for the WPAN data packet;

creating a virtual Ethernet packet that has a destination address of the identified virtual Ethernet network address; and providing the created virtual Ethernet packet to the application via the raw socket.

15. The device of claim 9, wherein the WPAN is a ZigBee network.

16. The device of claim 9, wherein the WPAN is a Zwave network.

17. A non-transitory computer-readable medium storing computer instructions for an application and instructions for a virtual Ethernet interface, that when executed by a processing unit of a computer, cause the processing unit to perform steps of:

opening, by the application running on the processing unit, a raw socket;

binding, by the application, the raw socket to an Internet protocol (IP) address of the virtual Ethernet interface running on the processing unit;

generating, by the application, an application data packet;

sending, by the application, the application data packet to the virtual Ethernet interface via the raw socket;

receiving, by the virtual Ethernet interface via the raw socket, the application data packet;

determining, by the virtual Ethernet interface from the application data packet, an Ethernet destination address of the application data packet;

based on the determined Ethernet destination address, identifying, by the virtual Ethernet interface, a destination identifier of a device on a wireless personal area network (WPAN);

accessing, by the virtual Ethernet interface, a payload of the application data packet;

creating, by the virtual Ethernet interface, a WPAN data packet that includes the destination identifier of the device on the WPAN and at least a portion of the payload from the application data packet; and transmitting, by the virtual Ethernet interface using a WPAN interface, the WPAN data packet to the device on the WPAN using the destination identifier of the device on the WPAN.

18. The non-transitory computer-readable medium of claim 17, wherein the instructions for the virtual Ethernet interface cause the processing unit to further perform:

prior to the receiving of the application data packet:

receiving the destination identifier of the device on the WPAN from the device on the WPAN via the WPAN interface; and adding the destination identifier of the device on the WPAN to a database that maps the destination identifier of the device on the WPAN to a virtual Ethernet address.

19. The non-transitory computer-readable medium of claim 18, wherein the identifying of the destination identifier of the device on the WPAN comprises:

determining that the Ethernet destination address of the application data packet matches the virtual Ethernet address in the database; and mapping the virtual Ethernet address in the database to the destination identifier of the device on the WPAN.

20. The non-transitory computer-readable medium of claim 18, wherein the instructions for the virtual Ethernet interface cause the processing unit to further perform:

prior to the receiving of the application data packet, sending the virtual Ethernet address to the application via the raw socket.

* * * * *